United States Patent Office 2,773,882
Patented Dec. 11, 1956

2,773,882

PROCESS FOR PREPARING 3-HALOFURAN

William W. Levis, Jr., Wyandotte, Mich., assignor, by mesne assignments, to The Pennsylvania Salt Manufacturing Company, Philadelphia, Pa., a corporation of Pennsylvania No Drawing. Application May 7, 1952,
Serial No. 286,621

17 Claims. (Cl. 260—346.1)

This invention pertains to halogenated derivatives of furan, and in particular to 3-chlorofuran and 3-bromofuran. More specifically, the invention is concerned with a novel process for the preparation of these interesting 3-halofurans.

The compounds of this invention may be put to various uses, such as intermediates for chemical synthesis. For example, these furan derivatives, by virtue of the conjugated double bonds contained therein, serve excellently as dienes for condensation with dienophiles, e. g., maleic anhydride, in Diels-Alder reactions.

Although 3-chlorofuran and 3-bromofuran are known compounds, they have hitherto remained in the realm of rare chemicals. The reason is to be found in the high cost attending their preparation by prior art procedures, which have involved the decarboxylation of 3-chloro-2-furoic acid and the analogous bromo acid. The decarboxylation reaction proceeds reasonably well, but the chief drawback has been the difficulty and high cost of preparing the acids themselves.

The present invention rests on the discovery that 3-chlorofuran and 3-bromofuran may be prepared in an economical and commercially feasible way. by reacting alkali metal or alkaline earth salts of 4,5-dihalo-3,6-endoxohexahydrophthalic acids with alkali metal or alkaline earth bases.

Examples of the foregoing halogenated acids are 4,5-dichloro - 3,6 - endoxohexahydrophthalic acid, 4,5 - dibromo - 3,6 - endoxohexahydrophthalic acid, and 4-bromo - 5 - chloro - 3,6 - endoxohexahydrophthalic acid, examples of salts being the disodium, dipotassium, dilithium, sodium potassium, sodium lithium, potassium lithium, calcium, strontium, barium, and magnesium salts of such acids. Examples of alkali metal and alkaline earth bases are sodium hydroxide, potassium hydroxide, lithium hydroxide, calcium hydroxide, strontium hydroxide, barium hydroxide, and magnesium hydroxide, as well as equivalent bases such as the corresponding oxides.

The following illustrative equation, which is believed to represent the overall reaction, is given to facilitate an understanding of this novel and surprising reaction by which the 3-halofurans of the invention are produced:

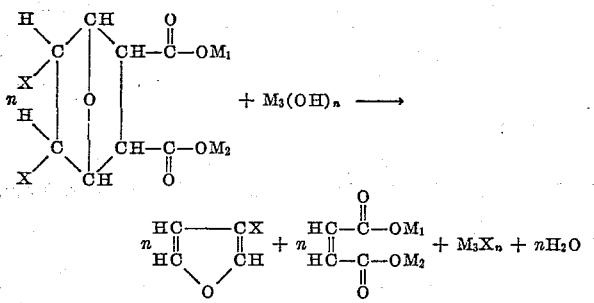

wherein X represents chlorine or bromine; wherein $M_1$ and $M_2$, taken individually, represent alkali metal, $M_3$ represents alkali metal, and $n$ has a value of 1; or wherein $M_1$ and $M_2$, taken collectively, represent alkaline earth, $M_3$ represents alkaline earth, and $n$ has a value of 2.

Although the applicant does not wish to be bound by any particular theory of reaction mechanism, it is believed that the reaction involves, inter alia, a splitting-out of one molecule of hydrohalic acid per molecule of metal 4,5-dihalo-3,6-endoxohexahydrophthalate, and that the alkali metal or alkaline earth base removes the hydrohalic acid from the sphere of reaction by neutralization. That is, the base serves as an acid acceptor.

Therefore, it is ordinarily preferred to employ substantially stoichiometric amounts of the reactants, the stoichiometric molar ratio of salt to base being 1:1 in the case of the monoacid bases and 2:1 in the case of the diacid bases. However, an excess of either reactant may be employed if desired for any reason, with the result that the excess will not take part in the reaction.

It will be understood that the symbols X in the above equation may represent the same halogen or different halogens, and if different, that a mixture of 3-halofurans (and inorganic halides) is obtainable.

For reasons of simplicity and convenience in balancing the equation, it is indicated therein that an alkali metal salt is reacted with an alkali metal base, and that an alkaline earth salt is reacted with an alkline earth base. While such procedure is quite convenient in many instances, e. g., in reacting dipotassium 4,5-dichloro-3,6-endoxohexahydrophthalate with potassium hydroxide, this is not a necessary condition. Thus it is contemplated that at times it may be desired to react an alkali metal salt with an alkaline earth base, or an alkaline earth salt with an alkali metal base, for as has been pointed out, the purpose of the base is to act as acceptor for the hydrohalic acid which is split out during the reaction. The use of a mixture of salts and/or bases for reaction purposes is also contemplated.

The reactants may be combined in any desired order. Thus the salt may be added portionwise to a reaction zone containing the full charge of base, or the base may be added portionwise to a reaction zone containing the full charge of salt, or both reactants may be added portionwise to the reaction zone, or the full charge of reactants may be introduced to the reaction zone before the reaction is initiated, or otherwise.

The reactants are brought together and reacted preferably in the presence of a solvent or liquid diluent which is non-reactive in the prevailing environment. Such solvent or diluent, which may be aqueous or non-aqueous (water being preferred in most instances), is preferably one having a reasonably high boiling point, such as say 100° C. or higher, and in which the reactants have a reasonable degree of solubility so that mutual contact between the reactants is facilitated. This does not mean, however, that it is necessary to have an entirely homogeneous reaction mixture, for it is contemplated that at times the reactants may be partially or wholly present in slurry, suspension, or emulsion form. In any event, it is desirable that the reaction mixture be efficiently agitated as the reaction proceeds, this being particularly true in the case of reaction mixtures containing appreciable quantities of solid material. Means of agitation are well-known to persons skilled in the art, and do not require elaboration.

Various non-aqueous solvents or diluents may be employed, among which there may be mentioned the higher-boiling aliphatic, saturated, monohydric and polyhydric alcohols, such as lauryl alcohol, glycerol, ethylene glycol, diethylene glycol, triethylene glycol, capryl alcohol, 1,6-hexanediol, n-heptyl alcohol, etc. It is pointed out that the use of such non-aqueous media may sometimes be quite advantageous, for example, when it is desired to conduct the reaction under rather high temperature conditions, without resorting to pressure equipment such as might be required in the case of aqueous media.

It is preferred to conduct the reaction under temperature conditions sufficiently high that it will proceed at a reasonable rate, but sufficiently low that side-reactions do not occur to any appreciable extent. Thus the reaction may suitably be carried out between about 100° C. and about 300° C., and particularly between 125° C. and 200° C. The reaction proceeds smoothly and increases in rapidity with elevation of temperature. The use of a reaction assistant, such as a catalyst, is not required, but is not precluded if desired for any reason.

The reaction may be carried out at any desired pressure, such as atmospheric, sub-atmospheric, or super-atmospheric. The choice of the particular pressure to be employed will often be largely governed by prevailing circumstances, such as the particular reaction medium being employed, the particular temperature level which it is desired to attain, available equipment, etc. In general, however, super-atmospheric pressure is preferred, particularly when the reaction is conducted in aqueous media.

The alkali metal and alkaline earth 4,5-dihalo-3,6-endoxohexahydrophthalates employed as reactants for the production of 3-chlorofuran and 3-bromofuran may be prepared in any desired manner. A suggested satisfactory procedure which employs readily available raw materials of reasonable cost, such as furan, maleic anhydride, halogens, and alkali metal and alkaline earth bases, is as follows.

Furan and maleic anhydride are reacted in equimolar quantities according to known methods, e. g., in the presence of diethyl ether, dioxan, or benzene. The reaction product is 3,6-endoxo-1,2,3,6-tetrahydrophthalic anhydride, the particular isomer obtained being the exo-cis, as defined in the case of the corresponding hexahydro compound by Woodward and Baer, Journal of the American Chemical Society, volume 70, pages 1161–1166. It is here noted that all of the endoxo compounds mentioned in the present specification and claims are of exo-cis isomeric configuration.

The 3,6-endoxo-1,2,3,6-tetrahydrophthalic anhydride is converted to a 4,5-dihalo-3,6-endoxohexahydrophthalic anhydride by chlorination or bromination, and such halogenated anhydride is then converted to the desired salt of 4,5-dihalo-3,6-endoxohexahydrophthalic acid by treatment with a suitable amount of alkali metal or alkaline earth base. Frequently it will be found convenient to avoid a separate step by premixing the halogenated anhydride with sufficient base for formation of the desired salt, as well as for reaction of such salt with base as illustrated in the above equation.

The following examples, which are by way of illustration and not of limitation, illustrate not only the practice of the invention in the production of 3-chlorofuran and 3-bromofuran, but also the preparation of certain intermediates as well as the use of 3-halofurans in chemical synthesis.

Example 1

A 12-liter, round-bottom flask equipped with stirrer, thermometer, and gas inlet tube was charged with 1660 g. (10.0 moles) of 3,6-endoxo-1,2,3,6-tetrahydrophthalic anhydride and 9 liters of glacial acetic acid. The flask was set in an ice bath.

The anhydride-acetic acid slurry was stirred and chlorine was passed in at a rate such as to maintain the temperature of the reaction mixture between 17° C. and 20° C. The reaction was quite exothermic.

After 1.25 hours of chlorination, almost all the above anhydride had dissolved and the solution was slightly turbid. Ten minutes later, a white crystalline solid started to precipitate. The chlorination was completed in a total of 2.75 hours.

The mixture had become yellowish-green and the gain in weight was 840 g. (indicating that some excess chlorine was dissolved in the acetic acid). The mixture was stirred for an additional hour to insure completeness of reaction, maintaining temperature as before. The slurry was filtered, and the solid white product thus obtained was rinsed with 2 liters of ethyl ether and air-dried at room temperature.

There was thus obtained 1820 g. (approximately 7.7 moles) of 4,5-dichloro-3,6-endoxohexahydrophthalic anhydride, melting at 164–166° C. and having a neutral equivalent of 117.5 (theory, 118.5).

Example 2

A 5-liter, round-bottom flask equipped with stirrer, thermometer, and dropping funnel was charged with 498 g. (3.0 moles) of 3,6-endoxo-1,2,3,6-tetrahydrophthalic anhydride and 3 liters of glacial acetic acid.

Bromine (490 g., or 3.06 moles) was slowly added from the dropping funnel to the vigorously stirred slurry, while maintaining the temperature of the mixture between about 25° C. and 35° C.; this addition was completed in one hour. The reaction, which was carried out in the presence of strong light, was only slightly exothermic. The reaction mixture was stirred for one hour after the bromine had been added and was allowed to stand overnight at room temperature.

The mixture was filtered, and the white solid so obtained was rinsed with 1 liter of hexane and air-dried. The resulting 4,5-dibromo-3,6-endoxohexahydrophthalic anhydride weighed 770 g. This product melted at 158–161° C. and had a neutral equivalent of 160 (theory, 163).

Example 3

4,5 - dichloro - 3,6 - endoxohexahydrophthalic anhydride (474 g.) was suspended in 2 liters of water. This slurry was vigorously stirred while 1550 g. of 28.9% aqueous potassium hydroxide solution was added, a cloudy solution being thus obtained. The solution, after being charged to a 2-gallon, stainless steel autoclave, was stirred and heated, reaction conditions being as follows:

| Time | Temperature, °C. | Pressure, lbs./sq. in. |
| --- | --- | --- |
| A. M.: | | |
| 8:35 | 27 | 0 |
| 9:25 | 110 | 0 |
| 9:50 | 151 | 50 |
| 10:10 | 152 | 65 |
| 10:30 | 153 | 85 |
| 11:30 | 152 | 85 |
| P. M.: | | |
| 12:30 | 152 | 85 |
| 1:30 | 158 | 105 |
| 2:00 | 151 | 90 |

Heating was discontinued and there was no residual pressure after the material had cooled to 25° C. The crude reaction mixture was a cloudy brown liquid containing some solid material.

The crude was transferred to a 5-liter flask provided with thermometer well, 6-inch Vigreaux column, condenser, and receiver. The flask was heated on a water bath, and distillation was discontinued when the pot temperature reached 99° C. The distillate comprised a water layer and an oil layer. The latter, after being separated from the water, was dried over anhydrous calcium sulfate. The crude dry oil, weighing 70 g., was fractionated through a 4-foot Podbielniak column with the following results:

Cut 1; B. P. 36–79° C.; 5 g.; water-white liquid.
Cut 2; B. P. 79–80° C.; 61 g.; water-white 3-chlorofuran, $d_4^{20} = 1.209$, $n_D^{20} = 1.459$.
Residue; 3 g.; brown liquid.

The physical constants of the 3-chlorofuran obtained in this experiment agree well with constants given by Shepard, Winslow and Johnson, Journal of the American Chemical Society, volume 52, pages 2083–2090.

Example 4

A slurry was prepared from 652 g. of 4,5-dibromo-3,6-endoxohexahydrophthalic anhydride and 2 liters of water, and 1600 g. of 28% aqueous potassium hydroxide was slowly added with vigorous stirring. The resulting cloudy, brown solution was charged to a 2-gallon, stainless steel autoclave and heated. Reaction conditions were as follows:

| Time | Temperature, °C. | Pressure, lbs./sq. in. |
|---|---|---|
| A. M.: | | |
| 8:45 | 25 | 0 |
| 9:25 | 132 | 25 |
| 9:35 | 150 | 60 |
| 10:35 | 152 | 85 |
| 11:35 | 155 | 95 |
| P. M.: | | |
| 12:35 | 152 | 90 |
| 1:35 | 152 | 90 |

Heating was discontinued and the reaction mixture was allowed to cool to 25° C., at which time there was no residual pressure. The crude reaction mixture consisted of a turbid, brown solution.

The crude was distilled in substantially the same way as described in the preceding example, until the overhead temperature reached 99° C. The distillate comprised an oil layer and a water layer, which were separated. The oil layer, after being dried over anhydrous potassium carbonate, weighed 107 g. This oil was fractionated through a 4-foot Podbielniak column into the following cuts:

Cut 1; B. P. up to 102.5° C.; 6 g.; water-white liquid.
Cut 2; B. P. 102.5–103° C.; water-white 3-bromofuran, $d_4^{20}=1.661$, $n_D^{20}=1.4970$.
Residue; 5 g.; black tar.

These constants are in good agreement with the values reported for 3-bromofuran by Shepard et al. in the above-mentioned article.

Example 5

A 500 ml. Erlenmeyer flask was charged with 49 g. of freshly distilled maleic anhydride dissolved in 75 g. of toluene, and 52 g. of 3-chlorofuran was added thereto. The resulting clear solution was allowed to stand at room temperature for 20 hours, at which time a thick slurry of white crystals was present in the liquid.

The crystals were recovered by filtration, successively rinsed with 50 ml. of toluene and 100 ml. of ethyl ether, and air-dried. The 4-chloro-3,6-endoxo-1,2,3,6-tetrahydrophthalic anhydride thus obtained weighed 84 g. It melted 119–122° C. with decomposition and had a neutral equivalent of 99.5 (theory, 100.3).

Example 6

3-bromofuran (89 g.) and a solution of 59 g. of maleic anhydride in 100 g. of toluene were brought together and reacted according to the procedure of the preceding example. Filtration, successive washing with 50 ml. of toluene and 100 ml. of ethyl ether, and air-drying yielded 117 g. of 4-bromo-3,6-endoxo-1,2,3,6-tetrahydrophthalic anhydride, melting 128–130° C. with decomposition and having a neutral equivalent of 121 (theory, 122.5).

While the invention has been more particularly described in connection with batch operation, it will be understood that it may also be practiced continuously or semi-continuously if desired.

The 3-halofuran products may be recovered from the reaction mixtures in any suitable way, such as by wet distillation, fractionation, solvent extraction, etc. For some purposes such fractionated crude product, or such wet-distilled or solvent-extracted crude product (after separation of the 3-halofuran from water or organic solvent), may be sufficiently pure. For other purposes, further purification of the crude product, e. g. rectification, may be desirable.

It is known that halofurans generally are somewhat unstable, undergoing slow resinification upon storage in the absence of a protectant. However, it has been reported in the literature that they may be kept for months without appreciable decomposition by storing them under a layer of an alkaline solution of hydroquinone.

It is pointed out that the inorganic halides and salts of organic acids formed by reaction may be recovered from the reaction mixtures as valuable by-products.

Having described the invention, it is understood that this is by way of illustration and that changes, omissions, additions, substitutions and/or modifications may be made within the scope of the claims without departing from the spirit of the invention. Accordingly, it is intended that the patent shall cover by suitable expression in the claims the features of patentable novelty which reside in the invention.

I claim:

1. A process for preparing 3-halofuran of the group consisting of 3-chlorofuran and 3-bromofuran which comprises mixing at least one base of the group consisting of alkali metal and alkaline earth bases with at least one salt of the group consisting of alkali metal and alkaline earth salts of exo - cis - 4,5 - dihalo-3,6-endoxohexahydrophthalic acids, the halogen atoms of said salts being selected from the group consisting of chlorine and bromine, and maintaining said reactants in mutual contact at a temperature above about 100° C. until 3-halofuran has been produced.

2. The process of claim 1 in which the reaction is conducted between about 100° C. and 300° C.

3. The process of claim 1 in which the reaction is conducted between about 125° C. and 200° C.

4. The process of claim 3 in which the reaction is conducted in the presence of water.

5. The process of claim 1 in which the reactants are employed in substantially stoichiometric amounts.

6. The process of claim 1 in which the base and salt reactants are alkali metal compounds of the group of alkali metals consisting of sodium, potassium and lithium.

7. The process of claim 6 in which the base and salt reactants are potassium compounds.

8. The process of claim 6 in which the base and salt reactants are sodium compounds.

9. The process of claim 6 in which the salt reactants are salts of exo-cis-4,5-dichloro-3,6-endoxohexahydrophthalic acid.

10. The process of claim 6 in which the salt reactants are salts of exo-cis-4,5-dibromo-3,6-endoxohexahydrophthalic acid.

11. The process of claim 1 in which the base and salt reactants are alkaline earth compounds of the group of alkaline earths consisting of calcium, strontium, barium and magnesium.

12. The process of claim 11 in which the salt reactants are salts of exo-cis-4,5-dichloro-3,6-endoxohexahydrophthalic acid.

13. The process of claim 11 in which the salt reactants are salts of exo-cis-4,5-dibromo-3,6-endoxohexahydrophthalic acid.

14. A process for the preparation of 3-chlorofuran which comprises intimately mixing in the presence of water alkali metal base and alkali metal salt of exo-cis-4,5-dichloro - 3,6 - endoxohexahydrophthalic acid, while maintaining said reactants under super-atmospheric pressure and temperature conditions ranging between about 125° C. and 200° C. for the production of said 3-chlorofuran, and recovering from the reaction mixture the 3-chlorofuran thus produced, the alkali metal of said base and the alkali metal of said salt being of the group consisting of sodium, potassium and lithium.

15. The process of claim 14 in which the reactants are employed in substantially stoichiometric amounts.

16. A process for the preparation of 3-bromofuran which comprises intimately mixing in the presence of water alkali metal base and alkali metal salt of exo-cis-4,5-dibromo-3,6-endoxohexahydrophthalic acid, while maintaining said reactants under super-atmospheric pressure and temperature conditions ranging between about 125° C. and 200° C. for the production of said 3-bromofuran, and recovering from the reaction mixture the 3-bromofuran thus produced, the alkali metal of said base and the alkali metal of said salt being of the group consisting of sodium, potassium and lithium.

17. The process of claim 1, in which the salt of exo-cis-4,5-dihalo-3,6-endoxohexahydrophthalic acid employed is formed in situ.

References Cited in the file of this patent
UNITED STATES PATENTS 2,550,494    Olin _____ Apr. 24, 1951

OTHER REFERENCES

Woodward et al., JACS, vol. 70 (1948), pp. 1161–66.